(12) United States Patent
Crosby et al.

(10) Patent No.: US 8,069,651 B2
(45) Date of Patent: Dec. 6, 2011

(54) MACHINE, ENGINE SYSTEM AND OPERATING METHOD

(75) Inventors: Daniel W. Crosby, Chillicothe, IL (US); Anil Raina, Stamford (GB)

(73) Assignee: Caterpillar Inc., Peoria, IL (US)

( * ) Notice: Subject to any disclaimer, the term of this patent is extended or adjusted under 35 U.S.C. 154(b) by 1132 days.

(21) Appl. No.: 11/897,459

(22) Filed: Aug. 30, 2007

(65) Prior Publication Data

US 2009/0056311 A1    Mar. 5, 2009

(51) Int. Cl.
- *F01N 3/00* (2006.01)
- *F01N 5/04* (2006.01)
- *F02B 33/44* (2006.01)

(52) U.S. Cl. ............... 60/280; 60/274; 60/295; 60/611

(58) Field of Classification Search .............. 60/273, 60/280, 285, 295, 324, 274, 597, 611
See application file for complete search history.

(56) References Cited

U.S. PATENT DOCUMENTS

| | | | |
|---|---|---|---|
| 5,460,784 A | 10/1995 | Gillbrand et al. | |
| 5,974,789 A | 11/1999 | Mathes et al. | |
| 6,167,698 B1 * | 1/2001 | King et al. | 60/286 |
| 6,276,139 B1 | 8/2001 | Moraal et al. | |
| 6,701,710 B1 * | 3/2004 | Ahrens et al. | 60/605.2 |
| 6,845,611 B2 | 1/2005 | Huthwohl et al. | |
| 6,865,881 B2 | 3/2005 | Monro, Jr. | |
| 2002/0083700 A1 | 7/2002 | Ellmer et al. | |
| 2005/0022526 A1 * | 2/2005 | Scheinert | 60/611 |
| 2006/0277908 A1 * | 12/2006 | Rouphael | 60/605.1 |
| 2007/0271918 A1 * | 11/2007 | Nishiyama et al. | 60/600 |

FOREIGN PATENT DOCUMENTS

| | | |
|---|---|---|
| DE | 19833619 | 1/2000 |
| EP | 1550796 | 7/2005 |
| WO | 2005095767 | 10/2005 |
| WO | WO 2005095767 A1 * | 10/2005 |
| WO | WO 2007081342 A1 * | 7/2007 |

* cited by examiner

*Primary Examiner* — Thomas Denion
*Assistant Examiner* — Audrey K Bradley
(74) *Attorney, Agent, or Firm* — Liell & McNeil

(57) ABSTRACT

A method of operating an engine system includes compressing intake air, restricting exhaust flow from the engine via a flow restriction device, and supplying compressor air to a compressed air subsystem of the engine during restricting exhaust flow. Supplying of compressor air may occur by selectively actuating a pressure control device to fluidly connect an inlet of a compressed air subsystem with the compressor. An associated machine and engine system include a compressor, a flow restriction device, a compressed air subsystem and a pressure control device to selectively fluidly connect the compressed air subsystem with the compressor when the flow restriction device is in a relatively more closed configuration.

19 Claims, 2 Drawing Sheets

MACHINE, ENGINE SYSTEM AND OPERATING METHOD

TECHNICAL FIELD

The present disclosure relates generally to machines and machine subsystems using compressed air, and relates more particularly to selectively providing compressed air to a machine subsystem during controllably restricting exhaust gas flow from an internal combustion engine.

BACKGROUND

A wide variety of machines, notably heavy-duty mobile machines such as construction, agricultural and transport machines utilize on-board compressed air for various purposes. Compressed air may be used for brake or implement system actuation, to power certain tools, for debris cleaning, and myriad other uses. Relatively recently, compressed air has begun to be used in conjunction with exhaust aftertreatment elements, in particular for compression ignition diesel engines.

One example of an exhaust aftertreatment element utilizing compressed air is known in the art as a urea injection module. Urea acts as a reducing agent for NOx in engine exhaust. It is typically necessary to provide some means for injecting the urea into an engine exhaust stream, and compressed air has been found to be well suited for this purpose. Many machines are equipped with a stand alone on-board air compressor, driven parasitically off the engine or electrically from a generator or alternator. More recently, compressed air has been provided from a compressor of a turbocharger coupled with the engine. In such systems, use of a separate air compressor may be dispensed with, so long as adequate compressed air from the turbocharger compressor is available.

U.S. Pat. No. 6,167,698 to King et al. is directed to an exhaust gas purification system for a lean burn engine. In the strategy described by King et al., a system is provided having a reservoir for storing compressed air received from a turbocharger. A reductant injector is in fluid communication with a reductant supply, and may be actuated to inject a quantity of reductant into a mixing chamber. The mixing chamber is configured for introducing air and reductant mixture into the engine's exhaust gas flow upstream of a NOx conversion catalyst. While the strategy disclosed by King et al. may have certain applications, there is always room for improvement. Under certain operating conditions it may be difficult for a standard turbocharger to accommodate the demand for compressed air in the King et al. approach due to the design of the system.

The present disclosure is directed to one or more of the problems or shortcomings set forth above.

SUMMARY OF THE DISCLOSURE

In one aspect, the present disclosure provides an engine system having an engine with an exhaust system coupled therewith. The engine system further includes a compressor configured to supply intake air to the engine, and a flow restriction device disposed in the exhaust system, the flow restriction device having a first configuration with a relatively larger flow area and a second configuration with a relatively smaller flow area. The engine system further includes a compressed air subsystem having an inlet, and a pressure control device configured to selectively fluidly connect the inlet of the compressed air subsystem with the compressor when the flow restriction device is in the second configuration.

In another aspect, the present disclosure provides a machine that includes a frame and an engine system mounted to the frame, the engine system including an engine, an exhaust system and a compressor configured to supply intake air to the engine. The engine system further includes a flow restriction device disposed in the exhaust system and having a first configuration with a relatively larger flow area, and a second configuration with a relatively smaller flow area. The machine still further includes a compressed air subsystem having an inlet, and a pressure control device configured to selectively fluidly connect the inlet of the compressed air subsystem with the compressor when the flow restriction device is in the second configuration.

In still another aspect, the present disclosure provides a method of operating an engine system that includes the steps of compressing intake air for the engine system via a compressor, and restricting exhaust flow from the engine system at least in part via a variable flow restriction device. The method still further includes a step of, during restricting exhaust flow, supplying compressor air to a compressed air subsystem of the engine system at least in part by selectively actuating a pressure control device to fluidly connect an inlet of the compressed air subsystem with the compressor.

DETAILED DESCRIPTION

Figure 1:
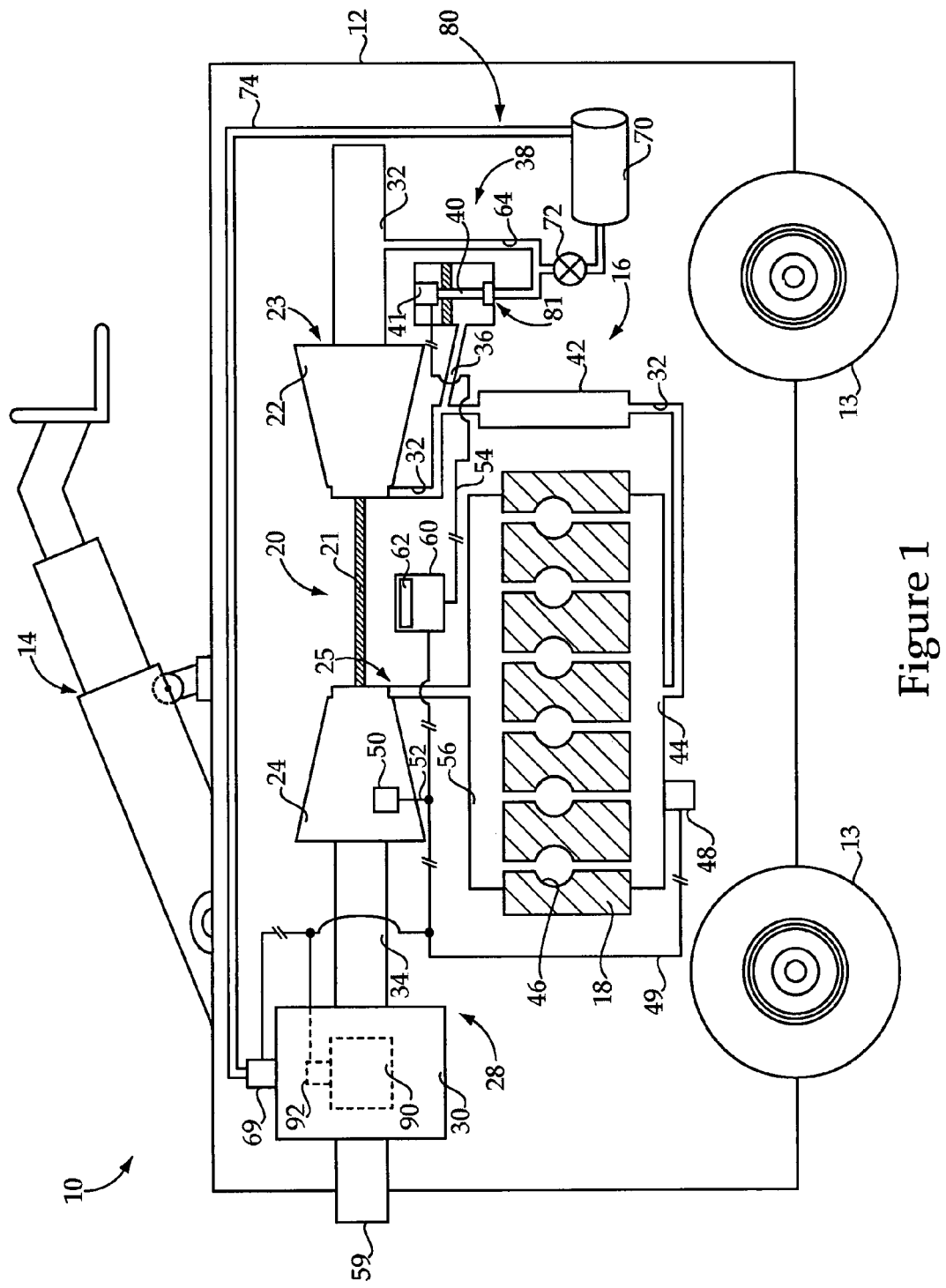
FIG. 1 is a side diagrammatic view of a machine having an internal combustion engine system, according to one embodiment.

Referring to FIG. 1, there is shown a machine 10 according to one embodiment of the present disclosure. Machine 10 may include a frame 12 having ground engaging elements 13, at least one of which is a drive element, and an implement system 14 mounted thereon. In the illustrated embodiment, machine 10 includes an implement system of the type commonly used with machines known in the art as telehandlers. It should be appreciated, however, that machine 10 might have a wide variety of designs. For instance, off-highway machines such as tractors, loaders, etc., as well as on-highway trucks and the like may be constructed and operated according to the teachings set forth herein. In still other embodiments, machine 10 might comprise a stationary machine such as a genset. Machine 10 may include an engine system 16, such as a compression ignition diesel engine system, having an engine housing 18 with a plurality of cylinders 46 therein. An intake air pathway 32 is provided for supplying air to engine system 16, and an exhaust outlet pathway 34 is provided to discharge engine exhaust gases through an aftertreatment element 30 and out a tailpipe 59, of an exhaust system 28.

Machine 10, and in particular engine system 16, may be configured and operated according to a unique strategy for supplying compressed air to aftertreatment element 30. In one embodiment, aftertreatment element 30 includes a urea injection NOx-reducing system, however, the present disclosure is not limited to any particular aftertreatment application. Nor is the present disclosure limited to the use of compressed air in the aftertreatment context at all. Machine 10 may include a compressed air subsystem 80 which can provide compressed air for a variety of purposes, as further described herein.

Machine 10 may further include a turbocharger 20 having a compressor 22 with an inlet 23, and a turbine 24 also having an inlet 25, coupled together via a shaft 21. In one embodiment, turbine 24 may comprise a variable geometry turbine of the type having internal turbine vanes (not shown) which may be controllably adjusted to vary a relative flow restriction of exhaust gases of engine system 16 passing through exhaust outlet pathway 34. Variable geometry turbines having movable walls to adjust an exhaust passage height or width, or a movable plate or the like, are known which might also be used in the context of the present disclosure. In other embodiments, rather than a variable geometry turbine, some other flow restriction device such as a variable gate or the like positioned within exhaust outlet pathway 34 might be used. It should also be appreciated that machine 10 might not include a turbocharger at all in certain embodiments. Turbine 24 might also be equipped with a wastegate to allow exhaust gases to bypass turbine 24. An actuator 50 may be operably coupled with turbine 24 to enable adjusting of turbine 24 from a first configuration, having a relatively larger flow area, to at least one other configuration having a relatively smaller flow area, or vice versa, to vary the extent to which exhaust gas flow is restricted thereby. Those skilled in the art will appreciate that restricting exhaust flow via turbine 24 will pressurize exhaust gases and hence increase their temperature, the significance of which will be apparent from the following description. Actuator 50 may be coupled via a communication line 52 with an electronic control unit 60 configured to command adjusting of turbine 24 between its two or more configurations. In one embodiment, electronic control unit 60 may comprise an engine controller for engine system 16, but might be a controller separate from the engine controller in other embodiments.

Engine system 16 may further include a pressure control device or bleed device 38, configured to selectively fluidly connect an inlet 81 of compressed air subsystem 80 with compressor 22, when turbine 24 is in a second configuration, having a relatively smaller flow area. Pressure control device 38 may include a valve member 40 which is movable between a first position and a second position, selectively connecting a first fluid passage 36 with a second fluid passage 64 via inlet 81. Pressure control device 38 may also be movable to a plurality of positions between its first and second positions to provide a range of fluid communication states between passages 36 and 64. Together, passages 36 and 64 may comprise an air diversion passage which provides a fluid connection from a position downstream of compressor 22 to a position upstream of compressor 22, allowing compressed air to be diverted then returned upstream compressor 22 if desired.

As mentioned above, compressed air may be supplied via compressed air subsystem 80 to aftertreatment element 30. To this end, compressed air subsystem 80 may include an air passage 74 fluidly connecting a compressed air storage tank 70 with an injection element 69 of aftertreatment element 30. In one embodiment, injection element 69 is configured to inject a mixture of compressed air and urea to exhaust outlet pathway 34 in a known manner. A valve 72, which may comprise a passive check valve or another valve such as an electrically actuated valve, may be positioned fluidly between passage 64 and compressed air storage tank 70. When pressure control device 38 is positioned such that passages 36 and 64 are fluidly connected, valve 72 may be actuated via compressed air to fluidly connect compressor 22 to compressed air storage tank 70 via passage 32, 36, etc. Accordingly, actuation of pressure control device 38 may be used to selectively supply compressor air to charge compressed air storage tank 70. A potentially substantial advantage that may be offered by the present disclosure over known strategies is that compressed air may be supplied to compressed air storage tank 70 where readily available, without wasting energy or otherwise affecting performance of engine system 16 in a negative manner. By supplying compressed air to subsystem 80 when extra compressor air is available, the size of compressor 22 may be based on projected engine air demand rather than engine air demand plus air demand from subsystem 80. The conditions under which compressed air will typically be supplied to tank 70 are further described hereinbelow.

Electronic control unit 60 may be in control communication with actuator 41 via a communication line 54 to enable adjusting of valve member 40 between different states to control fluid communication between passages 36 and 64, and hence fluid communications between compressor 22 and tank 70. In other embodiments, rather than an electronic control strategy, a passive control strategy utilizing pressure diaphragms or the like might be used to control positioning of valve member 40. An aftercooler 42 may be provided, as well as an intake manifold 44, configured to supply air to cylinders 46 in a conventional manner. As alluded to above, electronic control unit 60 may be configured to control the state of variable geometry turbine 24, as well as pressure control device 38, and potentially other components of machine 10.

To this end, electronic control unit 60 may include a computer readable memory 62 storing program information/software for executing its various control functions. Electronic control unit 60 may receive inputs from an indicating device such as a sensor 48 via a communication line 49, the inputs being indicative of an intake manifold pressure. Electronic control unit 60 may receive inputs from another sensor 92 via a communication line 66 which are indicative of a pressure drop across a particulate filter 90 in exhaust system 28. Signals received from sensor 92 may be used by electronic control unit 60 to determine that a pressure drop due to accumulated particulate matter in filter 90 is sufficient to justify initiating regeneration thereof.

In one embodiment, electronic control unit 60 may selectively connect compressor 22 with compressed air subsystem 80 during regenerating filter 90. In particular, turbine 24 may be adjusted to restrict exhaust outlet pathway 34, raising exhaust pressure and, hence, exhaust gas temperature to a level sufficient to initiate combustion of particulate matter trapped therein. In some instances, exhaust back pressure resulting from flow restriction via turbine 24 may exceed a desired level. One means for decreasing exhaust back pressure upstream turbine 24, is via adjusting pressure control device 38 to reduce airflow to engine system 16. Reducing airflow by bleeding off compressed air can result in a relatively richer fuel and air mixture supplied to cylinders 46, having a tendency to combust at relatively higher temperatures. Consequently, exhaust temperature can be maintained, or even increased, by actuating pressure control device 38 to further facilitate regeneration of filter 90 while alleviating excessive exhaust back pressures, with the extra compressor air being diverted to subsystem 80.

It is contemplated that sensing a pressure drop across filter 90 will be one practical implementation strategy for determining when initiation of filter regeneration is appropriate. Alternatives are contemplated, however, such as regenerating filter 90 at predetermined times or after predetermined periods of operation regardless of pressure drop. Further still, other aspects of operation of engine system 16 might be monitored to indirectly infer when regeneration of filter 90 is appropriate, such as monitoring how frequently and/or for how long engine system 16 is operated at idle speed or low load, etc., or how frequently and/or for how long engine system 16 is operated at a predetermined high speed and/or load. It will thus be appreciated that the present disclosure is not limited to any particular strategy for determining a timing of initiation of filter regeneration.

Regardless, once it is determined that filter regeneration is appropriate, electronic control unit 60 may carry out filter regeneration by increasing exhaust gas temperature to a temperature equal to or greater than a filter regeneration temperature to initiate combustion of particulate matter trapped in filter 90. In other embodiments turbine 24 may be adjusted for purposes other than filter regeneration, for example it may be adjusted for use as an exhaust brake, or to assist in warming engine system 16 during start-up. In particular, electronic control unit 60 may output signals to actuator 50 to adjust vanes, walls, or another adjustable flow restriction structures within turbine 24 to restrict exhaust flow.

While a range of operating conditions may be suitable for bleeding off compressor air via pressure control device 38, one practical implementation strategy may include bleeding off compressor air when exhaust back pressure exceeds a certain threshold, as alluded to above. During controllably restricting exhaust flow with turbine 24, electronic control unit 60 may receive signals generated via sensor 48 indicating intake manifold pressure. These signals/inputs may be used to control pressure control device 38 to limit exhaust back pressure, and supply compressed air to subsystem 80, as described herein. An exhaust manifold pressure sensor might also be used, in a similar manner, to output a signal indicative of exhaust back pressure. In general, intake manifold pressure will increase as exhaust back pressure upstream of turbine 24 increases. There is at least a generally proportional relationship between intake manifold pressure and exhaust back pressure upstream turbine 24. Electronic control unit 60, by monitoring intake manifold pressure, can determine when exhaust back pressure is at or exceeding a threshold, then output control commands to device 38 to selectively adjust airflow to engine system 16 and thereby reduce exhaust pressure upstream of turbine 24. Electronic control unit 60 may thus be understood as selectively reducing airflow to engine system 16 in a manner that is responsive to signals generated via sensor 48, which are indicative of exhaust back pressure.

Indicating device 48 might also comprise a device which outputs signals based on parameters indirectly indicative of intake manifold pressure and therefore indirectly indicative of exhaust back pressure upstream turbine 24. For instance, turbocharger speed, engine speed, load, fueling, etc. might be mapped to intake manifold pressure and, hence might be mapped to exhaust back pressure. It should therefore be appreciated that generating a signal indicative of exhaust back pressure, used by unit 60 to reduce exhaust pressure upstream of turbine 24, might take place in a variety of ways other than simply outputting a signal from a pressure sensor. Accordingly, unit 60, or a processor thereof, could fairly be considered to be an indicating device in some embodiments as it could generate a signal indicative of exhaust back pressure based on map values, values calculated via an equation, etc.

Position data for device 38 might also be recorded and mapped to recorded exhaust back pressure data, for instance pressure data developed in a laboratory or during a calibration of engine system 16. In other words, in setting up engine system 16 for operation, device 38 might be varied during operating engine system 16, and exhaust back pressure data recorded to establish a map having terms for exhaust back pressure and a position of device 38, or a position of actuator 41. This strategy would enable controlling exhaust back pressure via control signals to device 38 which are generated without directly sensing pressure anywhere in engine system 16.

Electronic control unit 60 will thus typically, but not necessarily, reduce exhaust pressure upstream of turbine 24 in a manner that is responsive to signals from sensor 48. As mentioned above, the reduction in exhaust pressure may be achieved by selectively reducing airflow to engine system 16 via device 38. In particular, when electronic control unit 60 determines that exhaust gas back pressure is too high, it may output control signals to device 38 to adjust valve member 40 via actuator 41 to a position at which fluid communications are established between passage 36 and passage 64, and inlet 81 is opened to fluidly connect compressor 22 with subsystem 80. As a result, air pressurized via compressor 22 is diverted from intake air pathway 32, effectively reducing airflow provided to cylinders 46. It should be understood that "intake air pathway 32" generally refers to the primary air intake passages upstream of compressor 22, and also downstream of compressor 22, to cylinders 46. Fuel injection into cylinders 46 will typically continue as directed by electronic control unit 60, or another engine controller, to provide fuel to engine system 16 based on speed and/or load, etc. Diverting air from intake air pathway 32 via device 38 will generally have two effects on engine system 16.

On the one hand, reducing intake airflow will reduce the air pressure supplied to intake manifold 44 and hence to cylinders 46. This reduction in air pressure can alleviate exhaust gas back pressure caused by the restricting of exhaust flow with turbine 24. Diverting air from intake air pathway 32 can also have the effect of creating a relatively higher fuel to air ratio provided to engine system 16, resulting in a corresponding increase in temperature of exhaust gases supplied to turbine 24, and thenceforth to filter 30. In other words, for a given fuel energy, a relatively smaller mass of air will reach a relatively higher temperature than would occur with a larger mass of air.

It should be appreciated that pressure control device 38 might include only an open position and a closed position, but in most embodiments will include a closed position and a range of open positions corresponding to a range of flow areas for inlet 81. When device 38 is in any of its open positions, compressed air can flow from intake air pathway 32 through passage 36 and into compressed air storage tank 70 via valve 72. It is contemplated that valve 72 might comprise an electronically controlled valve, but in many embodiments may be similar to a conventional check valve such that pressure of compressed air supplied via compressor 22 needs to be greater than a pressure in compressed air storage tank 70 for air to flow past valve 72. Otherwise, air diverted to compressed air subsystem 80 will not enter tank 70, but may instead travel via passage 64 back into intake air pathway 32.

By controlling engine system 16 in the manner described, exhaust back pressure created by restricting exhaust flow with turbine 24 can be alleviated, while the temperature of the exhaust gases supplied for initiating combustion of particulate matter in filter 30 can actually be maintained or increased. In other words, problematic exhaust gas pressure can be reduced without what might otherwise be an expected tradeoff of reduced exhaust gas temperature. Moreover, compressed air which might otherwise be wasted may be supplied to compressed air subsystem 80. It should be appreciated that while an exhaust aftertreatment element using compressed air may be one practical use of available compressed air, the present disclosure is not limited in this regard. For instance, rather than pressurizing a compressed air storage tank, compressed air could be supplied directly to aftertreatment element 30. Similarly, the compressed air need not be used in the context of an aftertreatment element at all, but could be used for some other on-board purpose such as for pneumatic actuators and the like.

Device 38 is shown as a variable gate positioned such that air is diverted from intake air pathway 32, then returned to intake air pathway 32 upstream of compressor 22 if tank 70 is already sufficiently charged with compressed air. This approach can result in intake air arriving at compressor 22 in an already somewhat compressed state. In other embodiments, intake air might be diverted at a different location, anywhere downstream of compressor 22, and might also be returned at a different location within engine system 16 than that shown, possibly downstream of turbine 24 or even downstream of aftertreatment element 30. Further still, intake air might simply be diverted and discharged to atmosphere, if tank 70 is sufficiently pressurized.

INDUSTRIAL APPLICABILITY

Figure 2:
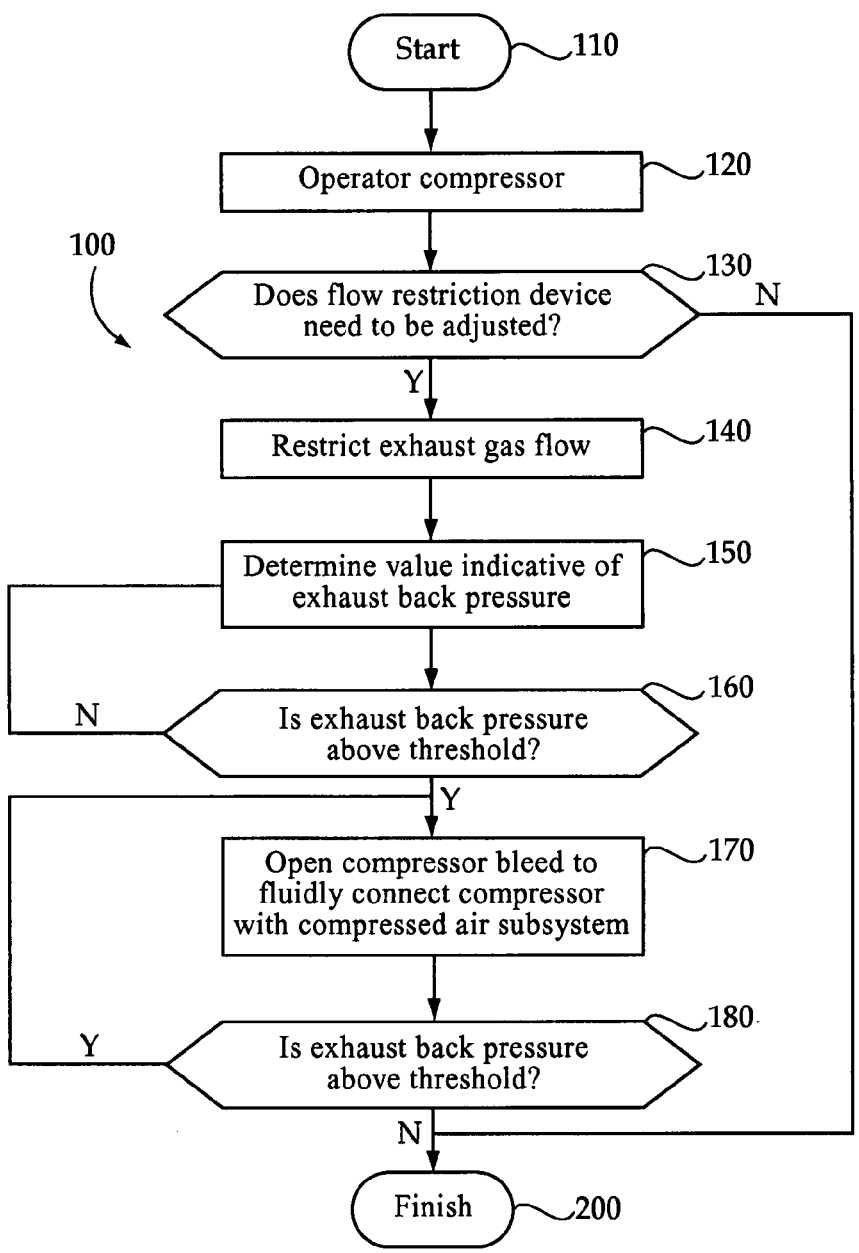
FIG. 2 is a flowchart illustrating a control process according to one embodiment.

Referring to FIG. 2, there is shown an exemplary control process according to the present disclosure via a flowchart 100. The process of flowchart 100 begins at a START or initialize step 110. From step 110 the process may proceed to step 120 to operate compressor 22. From step 120, the process may proceed to step 130 wherein electronic control unit 60 may query whether the flow restriction device needs to be adjusted. In other words, at step 130, electronic control unit 60 will be determining whether turbine 22 needs to be adjusted from a relatively more open configuration to a relatively more closed configuration, such that exhaust gas flow will be restricted in exhaust system 28. As mentioned above, embodiments are contemplated wherein some flow restriction device other than a variable geometry turbine might be used. Furthermore, it should be appreciated that flow restriction in exhaust system 28 might take place for a variety of reasons, including not only for filter regeneration but also where it is desirable to use turbine 24 as an exhaust brake, or for assisting in warming engine system 16 during start-up, etc.

If at step 130 turbine 24 does not need to be adjusted, the process may proceed ahead to finish at step 200. If turbine 24 needs to be adjusted, from step 130 the process may proceed to step 140 wherein electronic control unit 60 may output control signals, for example to actuator 50, to restrict exhaust gas flow via turbine 24 or some other flow restriction device. From step 140, the process may proceed to step 150 to determine a value indicative of exhaust back pressure. As discussed above, a value indicative of exhaust back pressure may be determined by directly sensing pressure, or by a variety of indirect means. From step 150, the process may proceed to step 160 wherein electronic control unit 60 may query whether exhaust back pressure is above a threshold. Various concerns, such as hardware limitations, may define a threshold level of exhaust back pressure which should not be exceeded. If at step 160, exhaust back pressure is not above a threshold, the process may return to step 150.

If exhaust back pressure is in fact above a desired threshold at step 160, the process may proceed to step 170 to open the compressor bleed to fluidly connect compressor 22 with compressed air subsystem 80. In other words, if exhaust back pressure is too high at step 160, electronic control unit 60 may output control signals to pressure control device 38 to adjust valve member 40 to open inlet 81. It should be appreciated that while the use of a controllable element such as pressure control device 38 may provide a practical implementation strategy, in other embodiments a passive control system/strategy might be used to adjust pressure control device 38, for example via the use of a diaphragm having a pressure surface exposed to a pressure of exhaust manifold 56. Further, pressure control device 38 might have simply an open or closed state, rather than a range of open states and a closed state.

From step 170, the process may proceed to step 180 wherein electronic control unit 60 may again query whether exhaust back pressure is above a threshold. If yes, the process may loop back to step 170 to again adjust pressure control device 38. If exhaust back pressure has been reduced at step 180, i.e. it is below the threshold, the process may proceed to step 200 to FINISH.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For example, while a stand-alone air compressor is not illustrated herein, the present disclosure is not thereby limited and an air compressor separate from compressor 22 might be used for supplying compressed air to subsystem 80. Other aspects, features and advantages will be apparent upon an examination of the attached drawings and appended claims.

What is claimed is:

1. An engine system comprising:
an engine having an exhaust system coupled therewith;
a compressor configured to supply intake air to said engine;
a flow restriction device disposed in said exhaust system, said flow restriction device having a first configuration with a relatively larger flow area, and a second configuration with a relatively smaller flow area;
a compressed air subsystem having an inlet configured to receive compressed air from said compressor, a first passage fluidly connected with the inlet for returning compressed air to said compressor, and a second passage fluidly connected with the inlet for supplying compressed air to an air actuated element;
a pressure control device configured to selectively fluidly connect the inlet of said compressed air subsystem with said compressor when said flow restriction device is in said second configuration;
an indicating device configured to output a signal indicative of exhaust back pressure in said exhaust system upstream said flow restriction device, wherein said pressure control device is operably coupled with said indicating device; and
a valve positioned fluidly between the inlet and the second passage.

2. The engine system of claim 1 wherein said compressed air subsystem comprises an exhaust aftertreatment element for said engine.

3. The engine system of claim 2 wherein said compressed air subsystem comprises a storage tank for compressed air, and wherein said aftertreatment element comprises an injection element driven at least in part via compressed air from said storage tank.

4. The engine system of claim 3 wherein said aftertreatment element comprises a urea injection module.

5. The engine system of claim 2 comprising an intake pathway wherein said compressor is disposed, and wherein said pressure control device comprises a bleed device positioned downstream said compressor in said intake pathway.

6. The engine system of claim 5 wherein said flow restriction device comprises a variable geometry turbine coupled with said compressor.

7. The engine system of claim 6 wherein said compressed air subsystem includes an air diversion passage comprising said first passage and extending from a first position in said intake pathway which is downstream said compressor to a second position in said intake pathway which is upstream said compressor.

8. The engine system of claim 7 wherein said compressed air subsystem includes a compressed air storage tank and said valve includes a pressure control valve fluidly between said air diversion passage and said compressed air storage tank.

9. A machine comprising:
a frame;
an engine system mounted to said frame, said engine system including an engine, an exhaust system, and a compressor configured to supply intake air to said engine;
said engine system further including a flow restriction device disposed in said exhaust system and having a first configuration with a relatively larger flow area, and a second configuration with a relatively smaller flow area;
a compressed air subsystem having an inlet configured to receive compressed air from said compressor, a first passage fluidly connected with the inlet for returning compressed air to said compressor, and a second passage fluidly connected with the inlet for supplying compressed air to an air actuated element;
a pressure control device configured to selectively fluidly connect the inlet of said compressed air subsystem with said compressor when said flow restriction device is in said second configuration;
an indicating device configured to output a signal indicative of exhaust back pressure in said exhaust system upstream said flow restriction device, wherein said pressure control device is operably coupled with said indicating device; and
a valve positioned fluidly between the inlet and the second passage.

10. The machine of claim 9 further comprising ground engaging elements coupled with said frame and including at least one drive element.

11. The machine of claim 10 wherein said engine system includes a turbocharger that includes said flow restriction device and said compressor, said flow restriction device comprising a variable geometry turbine of said turbocharger.

12. The machine of claim 11 wherein said air actuated element comprises an aftertreatment element for said engine.

13. The machine of claim 12 comprising an intake air pathway, and wherein said pressure control device comprises a bleed device for diverting compressed air from said intake air pathway, said bleed device having a plurality of open configurations with a plurality of different flow areas and a closed configuration.

14. The machine of claim 12 wherein said compressed air subsystem includes a compressed air storage tank coupled with said aftertreatment element, and said valve comprises a pressure control valve fluidly between said compressor and said compressed air storage tank.

15. A method of operating an engine system comprising the steps of:
compressing intake air for the engine system via a compressor;
restricting exhaust flow from the engine system at least in part via a variable flow restriction device;
during restricting exhaust flow, supplying compressed air to a compressed air subsystem of the engine system at least in part by selectively actuating a pressure control device to fluidly connect an inlet of the compressed air subsystem with the compressor;
returning compressed air to the compressor by way of a first passage fluidly connecting with the inlet, and responsive to a pressure of air within a second passage of the compressed air subsystem; and
supplying compressed air to an air actuated element by way of the second passage at least in part by passing compressed air through a valve positioned fluidly between the inlet and the second passage.

16. The method of claim 15 wherein the step of restricting exhaust flow comprises increasing exhaust back pressure at least in part by adjusting a variable geometry turbine from a first configuration to a second configuration.

17. The method of claim 16 further comprising the steps of reducing exhaust back pressure via the step of supplying compressed air to a compressed air subsystem, and storing compressed air in a compressed air storage tank of the compressed air subsystem.

18. The method of claim 17 further comprising a step of operating an exhaust aftertreatment element for the engine system at least in part via compressed air stored in the compressed air storage tank.

19. A method of operating an engine system comprising the steps of:
compressing intake air for the engine system via a compressor;
restricting exhaust flow from the engine system at least in part via a variable flow restriction device;
during restricting exhaust flow, supplying compressed air to a compressed air subsystem of the engine system at least in part by selectively actuating a pressure control device to fluidly connect an inlet of the compressed air subsystem with the compressor; and
returning compressed air to the compressor responsive to a pressure of air within the compressed air subsystem;
wherein the step of restricting exhaust flow comprises increasing exhaust back pressure at least in part by adjusting a variable geometry turbine from a first configuration to a second configuration;
the method further comprising the steps of reducing exhaust back pressure via the step of supplying compressed air to a compressed air subsystem, and storing compressed air in a compressed air storage tank of the compressed air subsystem; and
wherein the step of supplying compressed air comprises diverting compressed air from an intake pathway of the engine at a position downstream of the compressor, and wherein the step of returning further includes returning the compressed air to the intake pathway at a position upstream of the compressor responsive to a pressure of air within the compressed air storage tank.

* * * * *